(12) United States Patent
Taguchi et al.

(10) Patent No.: US 10,774,747 B2
(45) Date of Patent: Sep. 15, 2020

(54) MICRO GAS TURBINE SYSTEM

(71) Applicant: Panasonic Corporation, Osaka (JP)

(72) Inventors: Hidetoshi Taguchi, Osaka (JP); Kou Komori, Nara (JP); Osao Kido, Kyoto (JP); Fumitoshi Nishiwaki, Hyogo (JP); Yoshitsugu Nishiyama, Saitama (JP)

(73) Assignee: PANASONIC CORPORATION, Osaka (JP)

( * ) Notice: Subject to any disclaimer, the term of this patent is extended or adjusted under 35 U.S.C. 154(b) by 315 days.

(21) Appl. No.: 15/405,382

(22) Filed: Jan. 13, 2017

(65) Prior Publication Data

US 2017/0226928 A1    Aug. 10, 2017

(30) Foreign Application Priority Data

Feb. 4, 2016    (JP) .................. 2016-019804

(51) Int. Cl.
*F02C 7/18* (2006.01)
*F02C 6/08* (2006.01)
(Continued)

(52) U.S. Cl.
CPC .............. *F02C 7/185* (2013.01); *F01D 5/186* (2013.01); *F02C 3/085* (2013.01); *F02C 3/10* (2013.01);
(Continued)

(58) Field of Classification Search
CPC .... F02C 7/10; F02C 7/185; F02C 9/18; F02C 3/05; F02C 3/085; F02C 6/08;
(Continued)

(56) References Cited

U.S. PATENT DOCUMENTS 4,005,572 A * 2/1977 Giffhorn ................. F01D 5/045
415/117
4,991,394 A  2/1991 Wright
(Continued)

FOREIGN PATENT DOCUMENTS

JP     4-504294 A    7/1992
JP     2001-152871  6/2001
(Continued)

OTHER PUBLICATIONS

The Extended European Search Report dated Jun. 6, 2017 for the related European Patent Application No. 17151925.9.

*Primary Examiner* — Todd E Manahan
*Assistant Examiner* — Alyson Joan Harrington
(74) *Attorney, Agent, or Firm* — McDermott Will & Emery LLP

(57) ABSTRACT

A disclosed micro gas turbine system includes a micro gas turbine apparatus and an extracting cycle apparatus. The micro gas turbine apparatus includes a first compressor, a burner, and a first turbine. The first turbine expands a combustion gas generated by the burner. The extracting cycle apparatus includes a second compressor and a second turbine. The second compressor receives a flow of extracted air that is generated by extracting a part of a working fluid discharged from the first compressor. The second turbine expands the working fluid discharged from the second compressor. The working fluid discharged from the second turbine cools down the first turbine.

7 Claims, 8 Drawing Sheets

(51) Int. Cl.
 *F01D 5/18* (2006.01)
 *F02C 3/10* (2006.01)
 *F02C 3/08* (2006.01)

(52) U.S. Cl.
 CPC .............. *F02C 6/08* (2013.01); *F02C 7/18* (2013.01); *F05D 2220/76* (2013.01); *F05D 2250/82* (2013.01); *F05D 2260/202* (2013.01); *F05D 2260/213* (2013.01)

(58) Field of Classification Search
 CPC ........... F05D 2220/76; F05D 2260/202; F05D 2260/204; F01D 25/24; F01D 25/246
 See application file for complete search history.

(56) References Cited

U.S. PATENT DOCUMENTS

| | | | |
|---|---|---|---|
| 8,001,792 B1 | 8/2011 | Dvorak et al. | |
| 9,605,548 B2* | 3/2017 | Zhang | F01D 5/187 |
| 9,909,456 B2* | 3/2018 | Richner | F01D 9/042 |
| 2011/0138818 A1 | 6/2011 | Mizukami et al. | |
| 2012/0137651 A1 | 6/2012 | Taguchi et al. | |
| 2014/0140834 A1* | 5/2014 | Richner | F01D 9/042 |
| | | | 415/191 |
| 2015/0184516 A1* | 7/2015 | Zhang | F01D 5/187 |
| | | | 416/97 R |

FOREIGN PATENT DOCUMENTS

| | | |
|---|---|---|
| JP | 2008-063945 A | 3/2008 |
| JP | 2010-090818 A | 4/2010 |
| JP | 2013-524090 A | 6/2013 |
| WO | 1990/012204 A1 | 10/1990 |
| WO | 2011/152049 | 12/2011 |

\* cited by examiner

MICRO GAS TURBINE SYSTEM

BACKGROUND

1. Technical Field

The present disclosure relates to a micro gas turbine system.

2. Description of the Related Art

Conventionally, small gas turbine systems capable of providing a low temperature heat source have been known. For example, Japanese Unexamined Patent Application Publication No. 2001-152871 discloses a small gas turbine apparatus 300 as illustrated in FIG. 7. The small gas turbine apparatus 300 includes a first rotating mechanism including a first compressor 303 and a first expansion turbine 307, and a second rotating mechanism including a second compressor 313 and a second expansion turbine 316. The second compressor 313 receives and compresses a part of air compressed by and outputted from the first compressor 303. The second expansion turbine 316 expands the air compressed by the second compressor 313. Exhaust from the second expansion turbine 316 is usable as a low temperature heat source.

As another example, International Publication No. 2011/152049 discloses a gas turbine system 500 suitable for in-vehicle use as illustrated in FIG. 8. The gas turbine system 500 includes a gas turbine apparatus 502, a cooling fluid generating apparatus 505, an air conditioning unit 506, and a heat exchanger 507. The gas turbine apparatus 502 includes a first compressor 521 and a first expansion turbine 523, which are connected to each other via a first shaft 522; a burner 526; and a regenerated heat exchanger 527. Further, the gas turbine apparatus 502 includes a generator 524 connected to the first shaft 522. The cooling fluid generating apparatus 505 includes a second compressor 551 and a second expansion turbine 553, which are connected to each other via a second shaft 552; a cooler 55; and a water separator 556. Further, the cooling fluid generating apparatus 505 includes a generator 554 connected to the second shaft 552. The cooling fluid generating apparatus 505 is provided with a carburetor 557 upstream of the cooler 555. The air conditioning unit 506 includes a mixer 562 and a blower 561.

The first compressor 521 takes in and compresses air taken from atmospheric air. High pressure air discharged from the first compressor 521 flows into the regenerated heat exchanger 527 and then flows into the burner 526. The combustion gas generated in the burner 526 flows into and expands in the first expansion turbine 523. Thereby, the pressure of the combustion gas drops down to a level around the atmospheric pressure. The combustion gas discharged from the first expansion turbine 523 flows into the regenerated heat exchanger 527. In the regenerated heat exchanger 527, the combustion gas and high pressure air before flowing into the burner 526 exchange heat. The second compressor 551 is connected to one end of an air-extraction passage 504 for extracting air (extracted air) boosted by the first compressor 521 from the gas turbine apparatus 502. The second compressor 551 receives and compresses the extracted air. High pressure air discharged from the second compressor 551 passes through the carburetor 557 and the cooler 555. In the carburetor 557, the temperature of high pressure air discharged from the second compressor 551 drops due to vaporization heat of the fuel. High pressure air flowing out from the cooler 555 flows into and expands in the second expansion turbine 553. Thereby, the pressure of the high pressure air drops down to a level around the atmospheric pressure. Cool air (cooling fluid) is generated by expansion of the air in the second expansion turbine 553. The air discharged from the second expansion turbine 553 passes through the water separator 556 and then is fed to the air conditioning unit 506. The water separator 556 separates moisture from the air discharged from the second expansion turbine 553.

Air discharged from the second expansion turbine 553 is mixed with air supplied from the blower 561 in the mixer 562 and thereby is adjusted to a desired temperature. The adjusted air is fed to the heat exchanger 507. The heat exchanger 507 causes heat exchange between the adjusted air flowing out from the mixer 562 and the combustion gas flowing out from the regenerated heat exchanger 527 mentioned above and thereby heats the adjusted air flowing out from the mixer 562 to a temperature suitable for air conditioning. Then, the air heated by the heat exchanger 507 is supplied to a cabin. However, when cooling, the air adjusted by the air conditioning unit 506 to a temperature suitable for a demanded temperature in air conditioning also may be supplied directly to the cabin without passing through the heat exchanger 507. Thus, the air discharged from the second expansion turbine 553 in the gas turbine system 500 is utilized for air conditioning in the cabin.

SUMMARY

Techniques described in Japanese Unexamined Patent Application Publication No. 2001-152871 and International Publication No. 2011/152049 still have room for improvement from the viewpoint of enhancing the thermal efficiency. In view of this, one non-limiting and exemplary embodiment of the present disclosure provides a micro gas turbine system which is advantageous in enhancing the thermal efficiency.

In one general aspect, the techniques disclosed here feature a micro gas turbine system comprising: a micro gas turbine apparatus including: a first compressor that receives and compresses a working fluid; a burner that generates a combustion gas by injecting a fuel into the working fluid discharged from the first compressor; and a first turbine that is connected to the first compressor via a first shaft, and that expands the combustion gas generated by the burner, and an extracting cycle apparatus including: a second compressor that receives extracted air being a part of the working fluid discharged from the first compressor and that compresses the received extracted air as a working fluid; and a second turbine that is connected to the second compressor via a second shaft, and that expands the working fluid discharged from the second compressor, in which the micro gas turbine apparatus uses the working fluid expanded by the second turbine and discharged from the second turbine to cool down at least a portion of the first turbine or to cool down the working fluid to be fed to the first compressor.

The above micro gas turbine system is advantageous in enhancing the thermal efficiency.

Additional benefits and advantages of the disclosed embodiments will become apparent from the specification and drawings. The benefit and/or advantages may be individually obtained by the various embodiments and features of the specification and drawings, which need not all be provided in order to obtain one or more of such benefits and/or advantages.

DETAILED DESCRIPTION

Figure 1:
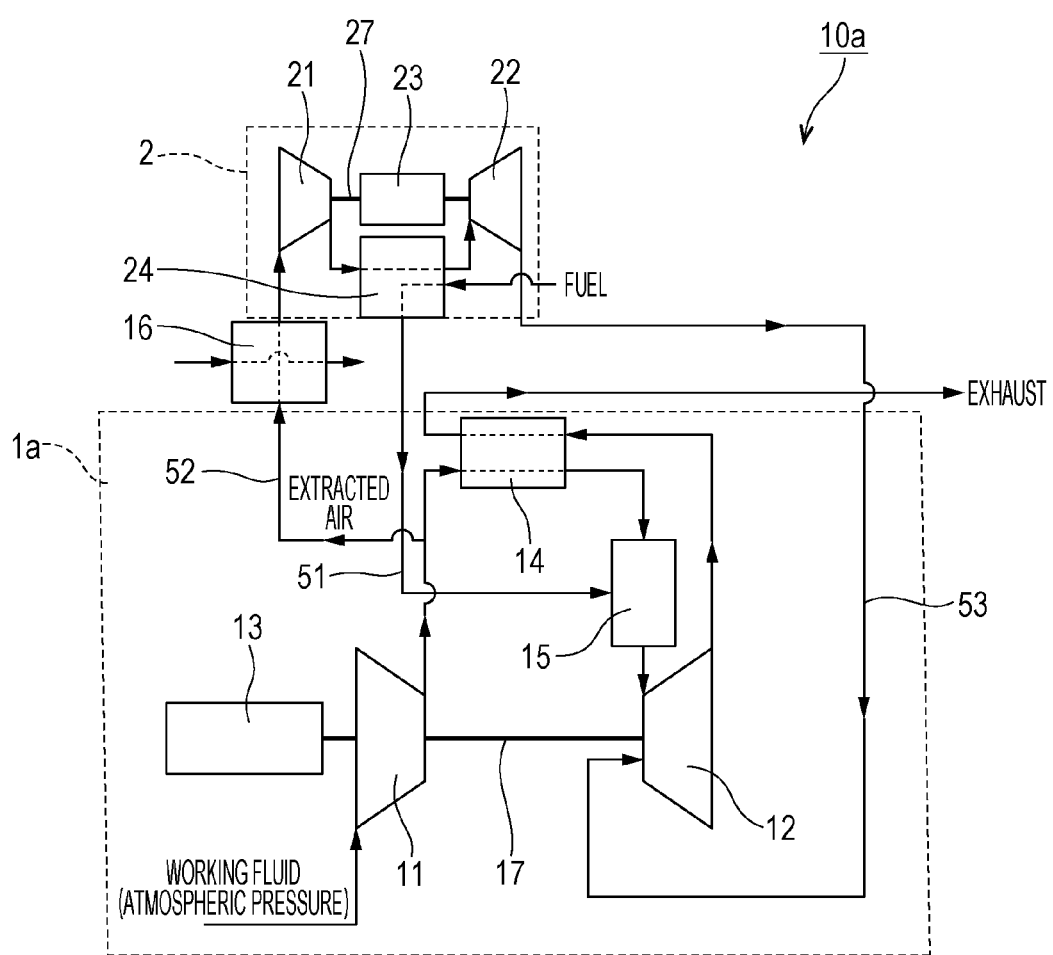
FIG. 1 is a configuration diagram of a micro gas turbine system according to a first embodiment.

Findings Based on Consideration of the Present Inventors

Japanese Unexamined Patent Application Publication No. 2001-152871 states that exhaust of a second expansion turbine 316 may be used as a low temperature heat source, but does not make specific consideration on the method of using exhaust of the second expansion turbine 316. International Publication No. 2011/152049 states that the cool air generated by expanding air in the second expansion turbine 553 is used for air conditioning of the vehicle, but does not make consideration on use of the cool air in applications other than air conditioning of the vehicle.

The gas turbine exhibits higher thermal efficiency as a gas turbine inlet temperature (temperature of a combustion gas flowing into the gas turbine) becomes higher. However, when the gas turbine inlet temperature is too high, the turbine located downstream of the burner in a flow of the combustion gas may be burnt and damaged. In this regard, a large gas turbine prevents burning of the turbine by cooling the turbine with a working fluid. Most of large gas turbines are provided with multiple stages of axial compressors and multiple stages of axial turbines. In this case, a working fluid at a specific ratio is extracted from a compressor suitable for a pressure of a working fluid flowing in a turbine to be cooled, and the extracted working fluid bypasses the burner and flows into the turbine suitable for the pressure of the extracted air to cool down the turbine. For example, among the multiple stages of axial turbines, a high pressure turbine disposed just after the burner is cooled down by receiving a flow of a working fluid extracted from a high pressure compressor located at a later stage among the multiple stages of axial compressors. In this case, the working fluid extracted from the high pressure compressor is cooled down as necessary. For example, a low pressure turbine at a later stage among the multiple stages of axial turbines is cooled down by receiving a flow of a working fluid extracted from a low pressure compressor located at an earlier stage among the multiple stages of axial compressors. This is because, in terms of state quantity, the working fluid passing through the low pressure turbine becomes a lower pressure than a pressure of a working fluid passing through the high pressure turbine.

On the other hand, the micro gas turbine is an inexpensive ultra-small gas turbine having a small and simplified construction including a high speed generator with a power generation output of approximately 200 kW or lower and the number of revolutions of 80,000 to 120,000 per minute. The micro gas turbine is usually used in an application where power is generated with simple handling. Unlike a large gas turbine, the micro gas turbine has to meet very high requirements of reducing the manufacturing cost and minimizing dimensions. Therefore, a typical micro gas turbine includes a centrifugal compressor and a radial turbine, in other words, a single stage of compressor and a single stage of turbine. When the micro gas turbine is exclusively used for power generation, a turbine inlet temperature needs to be raised to enhance thermal efficiency as in the large gas turbine. However, the turbine inlet temperature in the micro gas turbine is kept lower than the turbine inlet temperature of the large gas turbine. This is because the micro gas turbine is not configured to cool the turbine unlike the large gas turbine. One of the reasons that the micro gas turbine is not configured to cool the turbine is one of characteristics of the centrifugal compressor. The centrifugal compressor can more easily achieve a high pressure ratio in a single stage than the axial compressor. However, when the centrifugal compressor and the axial compressor under the same intake conditions at the same pressure ratio are compared with each other, a mass flow rate of the working fluid of the centrifugal compressor is apt to be smaller than mass flow rate of the working fluid of the axial compressor. If a part of the working fluid which has passed through the centrifugal compressor is extracted for cooling down the turbine, the micro gas turbine may fail to maintain a desired cycle efficiency due to insufficient output of the turbine. Even if a part of the working fluid which has passed through the centrifugal compressor is extracted for cooling down the turbine, the flow rate of the working fluid to be extracted is inevitably low. Conventional micro gas turbines are not provided with an apparatus or a structure that appropriately cools down the extracted working fluid for the purpose of cooling the turbine. For those reasons, it was considered that even if a part of the working fluid which has passed through the centrifugal compressor is extracted, the extracted working fluid does not have a flow rate, flow velocity, pressure, and temperature required to cool down the turbine and therefore cannot cool down the turbine in an appropriate manner. However, the present inventors found that parts of the turbine in the micro gas turbine can be cooled down by using the working fluid discharged from a turbine in an extracting cycle apparatus. The present inventors also found that thermal efficiency of the micro gas turbine system is drastically enhanced by cooling down parts of the turbine in the micro gas turbine with the working fluid discharged from the turbine in the extracting cycle apparatus. In addition, the present inventors found that thermal efficiency of the micro gas turbine system is also enhanced by cooling down a working fluid to be fed to a compressor of the micro gas turbine with a working fluid discharged from the turbine in the extracting cycle apparatus. A micro gas turbine system of the present disclosure is designed based on the findings of the present inventors.

A first aspect of the present disclosure provides a micro gas turbine system comprising: a micro gas turbine apparatus including: a first compressor that receives and compresses a working fluid; a burner that generates a combustion gas by injecting a fuel into the working fluid discharged from the first compressor; and a first turbine that is connected to the first compressor via a first shaft, and that expands the combustion gas generated by the burner, and an extracting cycle apparatus including: a second compressor that receives extracted air being a part of the working fluid discharged from the first compressor and that compresses the received extracted air as a working fluid; and a second turbine that is connected to the second compressor via a second shaft, and that expands the working fluid discharged from the second compressor, in which the micro gas turbine apparatus uses the working fluid expanded by the second turbine and discharged from the second turbine to cool down at least a portion of the first turbine or to cool down the working fluid to be fed to the first compressor.

Another representation of the first aspect of the present disclosure is a micro gas turbine system comprising:
a first passage in which a working fluid flows;
a first compressor that is present on the first passages;
a first turbine that is present on the first passage and that is connected to the first compressor via a first shaft;
a burner that is present on the first passage between the first compressor and the first turbine;
a second passage in which the working fluid flows, the second passage branching from a branching point in the first passage, the branching point being located between the first compressor and the burner in the first passage;
a second compressor that is present on the second passage; and
a second turbine that is present on the second passage and that is connected to the second compressor via a second shaft, wherein the first turbine includes
a turbine wheel that is rotatably connected to the first shaft; and
a nozzle blade that is disposed outside the turbine wheel in a radial direction of the turbine wheel and that is located around the turbine wheel,
the nozzle blade has a passage therein,
the passage in the nozzle blade constitutes the second passage, and
the nozzle blade is cooled by the working fluid that has passed through the second turbine.

Further another representation of the first aspect of the present disclosure is a micro gas turbine system comprising:
a first passage in which a working fluid flows;
a first compressor that is present on the first passages;
a first turbine that is present on the first passage and that is connected to the first compressor via a first shaft;
a burner that is present on the first passage between the first compressor and the first turbine;
a second passage in which the working fluid flows, the second passage branching from a branching point in the first passage, the branching point being located between the first compressor and the burner in the first passage;
a second compressor that is present on the second passage;
a second turbine that is present on the second passage and that is connected to the second compressor via a second shaft; and
a heat exchanger that is commonly present on a first part of the first passage and a second part of the second passage, wherein
the first part of the first passage is located upstream of the first compressor in a flowing direction of the working fluid in the first passage, and
the second part of the second passage is located downstream of the second turbine in the flowing direction of the working fluid in the second passage.

Further another representation of the first aspect of the present disclosure is a micro gas turbine system comprising:
a first passage in which a working fluid flows;
a first compressor that is present on the first passages;
a first turbine that is present on the first passage and that is connected to the first compressor via a first shaft;
a burner that is present on the first passage between the first compressor and the first turbine;
a second passage in which the working fluid flows, the second passage branching from a branching point in the first passage, the branching point being located between the first compressor and the burner in the first passage;
a second compressor that is present on the second passage;
a second turbine that is present on the second passage and that is connected to the second compressor via a second shaft; and
a heat exchanger that is commonly present on a first part of the first passage and a second part of the second passage, wherein
the first passage and the second passage are combined with each other at a meeting point, and
the meeting point is located upstream of the first compressor in a flowing direction of the working fluid in the first passage and downstream of the second turbine in the flowing direction of the working fluid in the second passage.

According to the first aspect, by using a working fluid expanded by the second turbine and discharged from the second turbine, at least a portion of the first turbine is cooled down or a working fluid to be fed to the first compressor is cooled down. When at least a portion of the first turbine is cooled down by using the working fluid expanded by the second turbine and discharged from the second turbine, this provides more room to raise the turbine inlet temperature of the first turbine, and thereby the thermal efficiency of the micro gas turbine system may be enhanced. Also, when the working fluid to be fed to the first compressor is cooled down by using a working fluid expanded by the second turbine and discharged from the second turbine, the temperature of the working fluid taken into the first compressor is low. Thus, power necessary for operating the first compressor is reduced. As a result, thermal efficiency of the micro gas turbine system may be enhanced. Thus, the micro gas turbine system according to the first aspect is advantageous in enhancing the thermal efficiency.

A second aspect of the present disclosure provides a micro gas turbine system, wherein in addition to the first aspect, the second turbine discharges the working fluid with a higher pressure than a pressure of at least a part of the combustion gas flowing in the first turbine, and the micro gas turbine apparatus cools down at least the portion of the first turbine by using the working fluid with the higher pressure discharged from the second turbine. According to the second aspect, at least a portion of the first turbine is cooled down by using the higher-pressure working fluid discharged from the second turbine. This provides more room to raise the turbine inlet temperature of the first turbine. Also, the second turbine discharges a working fluid with a higher pressure than a pressure of at least a part of the combustion gas flowing in the first turbine. Thus, the working fluid discharged from the second turbine may be caused to flow into a flow of the combustion gas.

A third aspect of the present disclosure provides a micro gas turbine system, wherein, in addition to the second aspect, the first turbine is a radial turbine including a turbine wheel that is fixed to the first shaft; and a turbine nozzle that includes nozzle blades disposed around the turbine wheel outside the turbine wheel in a radial direction, and the micro gas turbine apparatus cools down the nozzle blades by using the working fluid with the higher pressure discharged from the second turbine. According to the third aspect, the nozzle blades of the turbine nozzle of the radial turbine are cooled down, which provides more room to raise the turbine inlet temperature of the first turbine.

A fourth aspect of the present disclosure provides a micro gas turbine system, wherein, in addition to the third aspect, each of the nozzle blades includes a passage which is formed inside the nozzle blade, and through which the working fluid with the higher pressure discharged from the second turbine flows; and a film cooling passage that extends from an inner peripheral surface of the nozzle blade only to an outer peripheral surface of the nozzle blade facing the turbine wheel, and that communicates with the passage and outside of the nozzle blade. According to the fourth aspect, the inner peripheral surface of the nozzle blade may be collision-cooled by a working fluid flowing in a passage formed inside the nozzle blade. The film cooling passage extends from the inner peripheral surface of the nozzle blade only to the outer peripheral surface of the nozzle blade facing the turbine wheel. The pressure of the combustion gas is apt to drop around the outer peripheral surface of the nozzle blade facing the turbine wheel. Thus, the working fluid flowing in the passage is apt to flow out to the outside of the nozzle blade through the film cooling passage. Thus, the outer peripheral surface of the nozzle blade is apt to be film-cooled.

A fifth aspect of the present disclosure provides a micro gas turbine system, wherein, in addition to the fourth aspect, the first turbine further includes a back-side passage that communicates with the passages and that extends to a portion of a back face of the turbine wheel radially inside an end of the rear face of the turbine wheel in a radial direction. According to the fifth aspect, the back face of the turbine wheel may be cooled down by the working fluid which has passed through the back-side passage. With this cooling, the turbine wheel in the radial turbine is also cooled down, and this provides more room to raise the turbine inlet temperature of the first turbine.

A sixth aspect of the present disclosure provides a micro gas turbine system, wherein, in addition to the first aspect, the micro gas turbine apparatus further includes a heat exchanger that is disposed upstream of an inlet of the first compressor in a flow of the working fluid in the micro gas turbine apparatus, and that causes heat exchange between the working fluid to be fed to the first compressor and the working fluid discharged from the second turbine, and the second turbine discharges the working fluid that has a temperature lower than a temperature of the working fluid to be fed to the first compressor and that has a pressure higher than a pressure of the working fluid to be fed to the first compressor. According to the sixth aspect, the working fluid to be fed to the first compressor is cooled down in the heat exchanger by the working fluid discharged from the second turbine. Therefore, the temperature of the working fluid to be fed to the first compressor is low. Thus, power necessary for operating the first compressor is low. As a result, thermal efficiency of the micro gas turbine system may be enhanced.

A seventh aspect of the present disclosure provides a micro gas turbine system, wherein, in addition to the first aspect, the micro gas turbine apparatus further includes a mixer that is disposed upstream of an inlet of the first compressor in a flow of the working fluid in the micro gas turbine apparatus, and that mixes the working fluid discharged from the second turbine with a working fluid supplied from outside of the micro gas turbine system, and discharges the mixed fluid, and the second turbine discharges the working fluid that has a temperature lower than a temperature of the working fluid supplied from the outside of the micro gas turbine system to the mixer, and that has a pressure higher than a pressure of the working fluid supplied from the outside of the micro gas turbine system to the mixer. According to the seventh aspect, the working fluid supplied from the outside of the micro gas turbine system to the mixer is mixed with and cooled down by the working fluid discharged from the second turbine. Therefore, the temperature of the working fluid to be fed to the first compressor is low. Thus, power necessary for operating the first compressor is low. As a result, thermal efficiency of the micro gas turbine system may be enhanced.

An eighth aspect of the present disclosure provides a micro gas turbine system, wherein, in addition to any one of the first aspect to the seventh aspect, the extracting cycle apparatus includes an electric motor that is connected to the second turbine via the second shaft, and the electric motor adjusts a pressure of the working fluid to be discharged from the second turbine by adjusting a rotation speed of the second turbine through load adjustment. According to the eighth aspect, the pressure of the working fluid discharged from the second turbine is adjusted in an appropriate manner through load adjustment of the electric motor of the extracting cycle apparatus.

A ninth aspect of the present disclosure provides a micro gas turbine system, wherein, in addition to any one of the first aspect to the eighth aspect, the first compressor receives a flow of air with an atmospheric pressure as the working fluid. According to the ninth aspect, the working fluid for operating the micro gas turbine may be obtained in an easy manner.

A tenth aspect of the present disclosure provides a micro gas turbine system, wherein, in addition to any one of the first aspect to the ninth aspect, the first compressor is a centrifugal compressor. According to the tenth aspect, the micro gas turbine system may be downsized, and produce the effects described above in the first to ninth aspects.

Hereinafter, embodiments of the present disclosure are described with reference to the accompanying drawings. Description below is related to one example of the micro gas turbine system according to the present disclosure, and the present invention is not limited thereby.

First Embodiment

First, a micro gas turbine system 10a according to a first embodiment is described. As illustrated in FIG. 1, the micro gas turbine system 10a includes a micro gas turbine apparatus 1a and an extracting cycle apparatus 2. The micro gas turbine apparatus 1a includes a first compressor 11, a burner 15, and a first turbine 12. The first compressor 11 receives and compresses a working fluid. The burner 15 generates a combustion gas by injecting a fuel into the working fluid discharged from the first compressor 11. The first turbine 12 is connected to the first compressor 11 via a first shaft 17 and expands the combustion gas generated by the burner 15. The extracting cycle apparatus 2 includes a second compressor 21 and a second turbine 22. The second compressor 21 receives an extracted air that is a part of the working fluid discharged from the first compressor 11 and compresses the extracted air as a working fluid. The second turbine 22 is connected to the second compressor 21 via a second shaft 27 and expands the working fluid discharged from the second compressor 21. The micro gas turbine apparatus 1a cools down at least a portion of the first turbine 12 by using the working fluid expanded by the second turbine 22 and discharged from the second turbine 22. Thus, a turbine inlet temperature (temperature of the combustion gas flowing into the first turbine 12) of the first turbine 12 may be raised. For example, the inlet temperature of the first turbine 12 may be raised to 1,300 K or higher. Thus, the micro gas turbine system 10*a* is advantageous in enhancing the thermal efficiency.

The first compressor 11, for example, receives air of atmospheric pressure as a working fluid. The first compressor 11 is, for example, a centrifugal compressor.

As illustrated in FIG. 1, the micro gas turbine apparatus 1*a* further includes, for example, a motor generator 13. The motor generator 13 is connected to the first shaft 17. The motor generator 13 functions as an electric motor when the micro gas turbine apparatus 1*a* is activated, and causes the first compressor 11 to operate by rotating the first shaft 17. The micro gas turbine apparatus 1*a* further includes, for example, a regenerated heat exchanger 14. In this case, the high pressure working fluid discharged from the first compressor 11 flows into the regenerated heat exchanger 14. The working fluid flowing into the regenerated heat exchanger 14 is heated in the regenerated heat exchanger 14 by heat exchange with a combustion gas which has passed the first turbine 12. The working fluid which has passed the regenerated heat exchanger 14 flows into the burner 15.

As illustrated in FIG. 1, a fuel is supplied into the burner 15 through a fuel supply passage 51 and injected into the working fluid in the burner 15. Inside the burner 15, for example, a spark electrode (not shown) is disposed to cause combustion in the burner 15 by spark and thereby generate a combustion gas of high temperature. The fuel is, for example, a liquid fuel or a gas fuel. As the liquid fuel, for example, a petroleum-based fuel such as gasoline, kerosene, light oil, and heavy oil, an alcohol-based fuel such as methanol and ethanol, and an alcohol-based mixed fuel containing an alcohol-based fuel may be used. As the gas fuel, for example, compressed natural gas (CNG), liquefied petroleum gas (LPG), methyl tertiary butyl ether (MTBE), hydrogen, or the like may be used.

The combustion gas generated in the burner 15 flows into the first turbine 12 and expands in the first turbine 12. Power is generated as a rotating torque from the combustion gas expanding in the first turbine 12. The power causes the first compressor 11 to operate, and a surplus power causes the motor generator 13 to generate electric power. The combustion gas discharged from the first turbine 12 flows into the regenerated heat exchanger 14. As described above, heat exchange between the high-pressure working fluid before flowing into the burner 15 and the combustion gas is caused in the regenerated heat exchanger 14, and thereby the temperature of the combustion gas drops. The combustion gas flowing out from the regenerated heat exchanger 14 is discharged to the outside of the micro gas turbine apparatus 1*a*.

As a result that a part of the working fluid discharged from the first compressor 11 is pulled out, an extracted air is generated. As illustrated in FIG. 1, the extracted air is supplied to the second compressor 21 through an air-extraction passage 52. An inlet of the air-extraction passage 52 is formed in the middle of passage of the working fluid that connects an outlet of the first compressor 11 and an inlet of the working fluid in the burner 15 with each other. In a case where the micro gas turbine apparatus 1*a* includes the regenerated heat exchanger 14, the inlet of the air-extraction passage 52 is typically formed in the middle of passage of the working fluid that connects the outlet of the first compressor 11 and the inlet of the working fluid in the regenerated heat exchanger 14 with each other. Flow rate of the extracted air flowing in the air-extraction passage 52 is not restricted particularly. However, for example, 20% to 50% by mass of the working fluid discharged from the first compressor 11 is extracted as the extracted air.

As illustrated in FIG. 1, the micro gas turbine system 10*a* further includes, for example, an intermediate cooler 16. The intermediate cooler 16 is disposed in the middle of the air-extraction passage 52. The extracted air is cooled down in the intermediate cooler 16 by a heating medium such as, cooling water or the like. Thus, low temperature extracted air cooled down in the intermediate cooler 16 is supplied into the second compressor 21 as a working fluid. Thus, power necessary for operating the second compressor 21 may be reduced.

The working fluid flowing into the second compressor 21 is compressed in the second compressor 21 and discharged from the second compressor 21. As illustrated in FIG. 1, the extracting cycle apparatus 2 further includes, for example, a heat exchanger 24. The heat exchanger 24 causes heat exchange between the working fluid discharged from the second compressor 21 and a fuel before flowing into the burner 15. Thus, the temperature of the working fluid drops by passing through the heat exchanger 24, and the working fluid discharged from the second compressor 21 transforms into a low-temperature and high-pressure state. The working fluid turned into the low-temperature and high-pressure state flows into the second turbine 22. The pressure of the working fluid flowing into the second turbine 22 drops by expanding in the second turbine 22. At least a portion of the first turbine 12 is cooled down by using the working fluid discharged from the second turbine 22. For example, as illustrated in FIG. 1, passage 53 of the working fluid extends from the outlet of the second turbine 22 up to at least a portion of the first turbine 12.

Although pressure of the working fluid drops in the second turbine 22, the second turbine 22 discharges, for example, a working fluid with a pressure higher than a pressure of at least a part of the combustion gas flowing in the first turbine 12. In this case, the micro gas turbine apparatus 1*a* cools down at least a portion of the first turbine 12 by using the higher pressure working fluid discharged from the second turbine 22. The second turbine 22 discharges a working fluid with a pressure higher than a pressure of at least a part of the combustion gas flowing in the first turbine 12 and therefore causes the working fluid discharged from the second turbine 22 to flow out into the flow of the combustion gas.

As illustrated in FIG. 1, the extracting cycle apparatus 2 includes an electric motor 23. The electric motor 23 is connected to the second turbine 22 via a second shaft 27. The electric motor 23 is typically constituted as a part of a generator motor. The electric motor 23 adjusts the pressure of the working fluid discharged from the second turbine 22 by adjusting a rotation speed of the second turbine 22 through load adjustment. For example, with such function of the electric motor 23, the second turbine 22 discharges a working fluid with a pressure higher than a pressure of at least a portion of the combustion gas flowing in the first turbine 12. A known technique related to the electric motor load adjustment method such as control by an inverter may be applied to the load adjustment of the electric motor 23.

Figure 2:
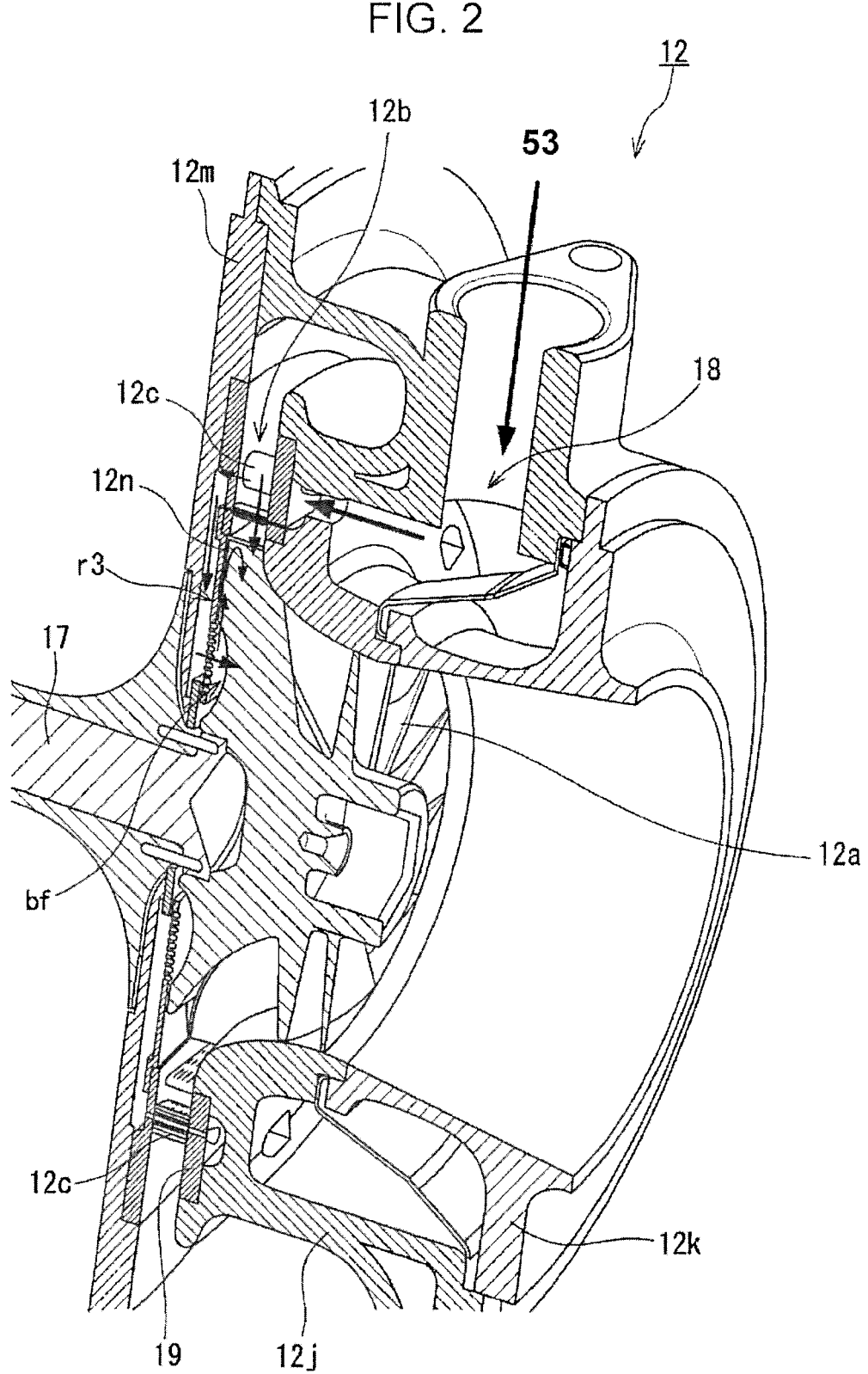
FIG. 2 is a perspective cross-sectional view illustrating an inner structure of a first turbine according to the first embodiment.

As illustrated in FIG. 2, the first turbine 12 is, for example, a radial turbine including a turbine wheel 12*a* and a turbine nozzle 12*b*. The turbine wheel 12*a* is fixed to the first shaft 17. The turbine nozzle 12*b* includes nozzle blades 12*c* disposed around the turbine wheel 12*a* outside the turbine wheel 12*a* in a radial direction. The first turbine 12 further includes, for example, a casing 12*j* and a casing 12*k*.

The turbine wheel 12a and the turbine nozzle 12b are housed inside the casing 12j, and the casing 12j forms a passage in which the combustion gas flows inward a radial direction toward the turbine wheel 12a. The combustion gas flowing into the first turbine 12 flows toward the turbine wheel 12a through the turbine nozzle 12b. The casing 12k forms a passage for receiving a flow of the combustion gas which has passed the turbine wheel 12a. The combustion gas flowing into the turbine wheel 12a causes the turbine wheel 12a to rotate and thereby the power is generated. The micro gas turbine apparatus 1a, for example, cools down the nozzle blades 12c of the turbine nozzle 12b by using the high pressure working fluid discharged from the second turbine 22. Thus, the inlet temperature of the first turbine 12 may be raised. An arrow in FIG. 2 conceptually indicates a direction in which the working fluid discharged from the second turbine 22 flows.

Figure 3:
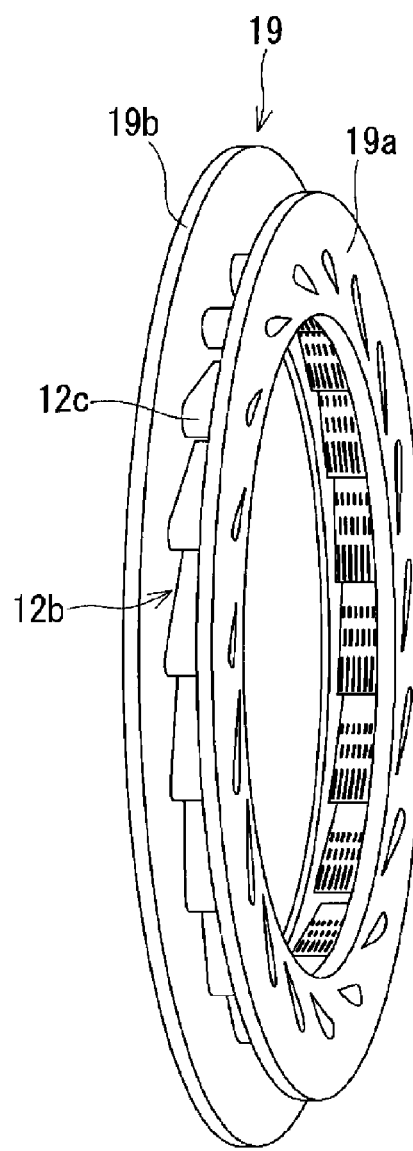
FIG. 3 is a perspective view of a turbine nozzle ring illustrated in FIG. 2.

As illustrated in FIG. 3, the turbine nozzle 12b is formed, for example, by a turbine nozzle ring 19. The turbine nozzle ring 19 includes a first annular plate 19a, a second annular plate 19b, and a predetermined quantity of nozzle blades 12c disposed in a circumferential direction. The nozzle blades 12c are disposed between the first annular plate 19a and the second annular plate 19b. The turbine nozzle ring 19 is fixed, for example, to the casing 12j. Thus, a predetermined number of nozzle blades 12c are disposed in a circumferential direction so as to enclose the turbine wheel 12a outside the turbine wheel 12a in the radial direction.

Figure 4:
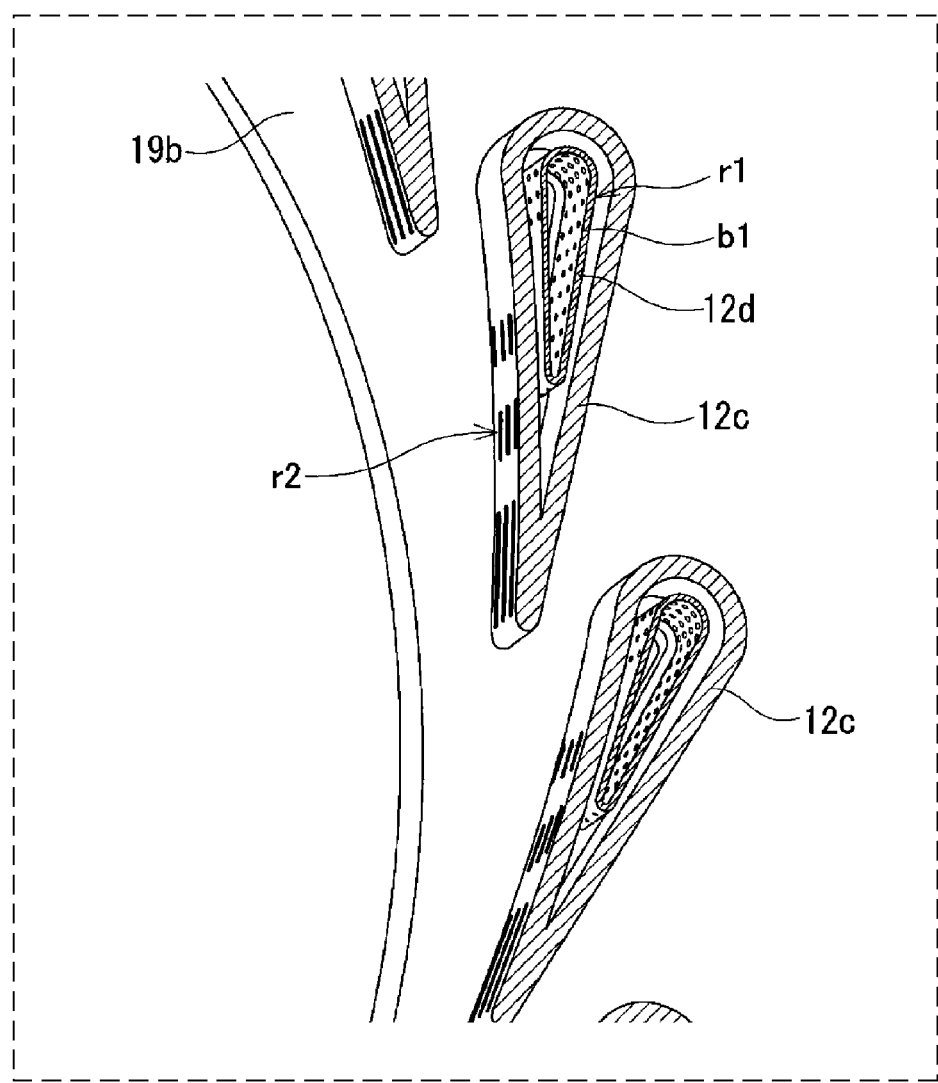
FIG. 4 is a perspective cross-sectional view illustrating an inner structure of a nozzle blade illustrated in FIG. 3.

As illustrated in FIG. 4, each of the nozzle blades 12c includes a passage r1 and a film cooling passage r2. The passage r1 is a passage of the high pressure working fluid discharged from the second turbine 22, the passage being formed inside the nozzle blade 12c. The film cooling passage r2 is a passage which extends from the inner peripheral surface of the nozzle blade 12c only to the outer peripheral surface of the nozzle blade 12c facing the turbine wheel 12a and communicates with the passage r1 and the outside of the nozzle blade 12c. The nozzle blade 12c has, for example, a tubular structure extending in an axial direction of the turbine nozzle ring 19. As illustrated in FIG. 2, a communication passage 18 is formed inside the casing 12j. Internal space of the nozzle blade 12c is communicated with the passage 53 by the communication passage 18. The first annular plate 19a has a through-hole at a location facing the internal space of each of the nozzle blades 12c in a circumferential direction and a radial direction of the turbine nozzle ring 19. Thus, the high pressure working fluid discharged from the second turbine 22 is supplied to the passage r1 inside the nozzle blade 12c through the passage 53, the communication passage 18, and the through-hole of the first annular plate 19a. Inner peripheral surface of the nozzle blade 12c is collision-cooled by the working fluid supplied to the passage r1. The working fluid supplied to the passage r1 is discharged through the outer peripheral surface of the nozzle blade 12c facing the turbine wheel 12a of the nozzle blade 12c through the film cooling passage r2. Thus, the outer peripheral surface of the nozzle blade 12c facing the turbine wheel 12a is film-cooled. The pressure of the combustion gas is apt to drop around the outer peripheral surface of the nozzle blade c facing the turbine wheel 12a. Thus, the working fluid flowing in the passage r1 is apt to flow out to the outside of the nozzle blade 12c through the film cooling passage r2. Thus, the outer peripheral surface of the nozzle blade 12c is apt to be film-cooled.

For example, as illustrated in FIGS. 3 and 4, multiple groups each including multiple film cooling passages r2 arranged in the axial direction of the turbine nozzle ring 19 are arranged in a circumferential direction of the turbine nozzle ring 19 in each of the nozzle blades 12c. Two adjacent groups of film cooling passages r2 are disposed such that the film cooling passages r2 in one group are shifted in the axial direction of the turbine nozzle ring 19 from the film cooling passages r2 in the other group. Thus, the outer peripheral surface of the nozzle blade 12c is easily film-cooled uniformly.

As illustrated in FIG. 4, for example, an inner tube 12d is disposed inside the nozzle blade 12c. The passage r1 is separated into two spaces inside the nozzle blade 12c by the inner tube 12d. The inner tube 12d includes multiple through-holes, and a space formed between the inner peripheral surface of the nozzle blade 12c and the outer peripheral surface of the inner tube 12d communicates with the internal space of the inner tube 12d. The first annular plate 19a has, for example, a through-hole at a location facing the internal space of the inner tube 12d disposed inside each of nozzle blades 12c in a circumferential direction and a radial direction of the turbine nozzle ring 19. Thus, a part of the working fluid which has passed through the passage 53 flows into the internal space of the inner tube 12d and is supplied to a space formed between the inner peripheral surface of the nozzle blade 12c and the outer peripheral surface of the inner tube 12d through through-holes of the inner tube 12d. For example, about 50% of the working fluid which has passed through the passage 53 is supplied into a space formed between the inner peripheral surface of the nozzle blade 12c and the outer peripheral surface of the inner tube 12d. Through-holes of the inner tube 12d are formed, for example, at a portion of the outer peripheral surface of the inner tube 12d facing the inner peripheral surface of the nozzle blade 12c where the film-cooling passage r2 is not formed. With this configuration, the inner peripheral surface of the nozzle blade 12c corresponding to the outer peripheral surface of the nozzle blade 12c which is hardly film-cooled by the working fluid supplied to the passage r1 may be collision-cooled. Thus, the nozzle blade 12c may be cooled down in an appropriate manner by combination of collision-cooling and film-cooling. The temperature of the outer peripheral surface of the nozzle blade 12c where the film cooling passage r2 is not formed is apt to be raised by the combustion gas. Thus, thermal barrier coating (TBC) by silicon nitride or the like is preferably formed on the outer peripheral surface of the nozzle blade 12c where the film cooling passage r2 is not formed.

As illustrated in FIG. 2, the first turbine 12, for example, further includes a back-side passage r3. The back-side passage r3 communicates with the passage r1 and extends toward a portion of a back face bf located on a more inner side in radial direction than an end of the back face bf of the turbine wheel 12a in a radial direction. Thus, the back face bf of the turbine wheel 12a may be cooled down by the working fluid which has passed through the back-side passage r3. With this configuration, the turbine wheel 12a in the radial turbine is also cooled down, and thereby turbine inlet temperature of the first turbine 12 is apt to be raised.

The first turbine 12 further includes, for example, a backplate 12m and a heat shield plate 12n. The backplate 12m separates the first compressor 11 and the first turbine 12 from each other. The heat shield plate 12n is disposed so as to face the back face bf of the turbine wheel 12a. At least a portion of the back-side passage r3 is formed by the backplate 12m and the heat shield plate 12n. The second annular plate 19b has a through-hole at a location facing the internal space of each of nozzle blades 12c in a circumferential direction and a radial direction of the turbine nozzle ring 19.

For example, the second annular plate 19b has a through-hole at a location facing the internal space of the inner tube 12d disposed inside each of nozzle blades 12c in a circumferential direction and a radial direction of the turbine nozzle ring 19. For example, the back-side passage r3 communicates with the passage r1 through the through-hole formed on the second annular plate 19b. About 50% of the working fluid which has passed through the passage 53 is supplied to the back-side passage r3 through the passage r1. Multiple through-holes are formed at an end on the inner side of the heat shield plate 12n in a radial direction. The working fluid flowing in the back-side passage r3 passes through the multiple through-holes of the heat shield plate 12n and is blown to the back face bf of the turbine wheel 12a. Thus, the turbine wheel 12a is collision-cooled. The working fluid blown to the back face bf of the turbine wheel 12a is mixed with the combustion gas flowing in the turbine wheel 12a and discharged to the outside of the first turbine 12. A scallop for reducing the stress is preferably formed on the back face bf of the turbine wheel 12a.

Second Embodiment

A micro gas turbine system 10b according to a second embodiment is described. The micro gas turbine system 10b has the same configuration as the micro gas turbine system 10a except for components otherwise described. Components of the micro gas turbine system 10b identical or corresponding to components of the micro gas turbine system 10a are assigned with same reference numerals, and description thereof is omitted. Description regarding the first embodiment also applies to the second embodiment unless otherwise inconsistent technically.

The micro gas turbine system 10b cools down a working fluid to be fed to the first compressor 11, by using a working fluid expanded by the second turbine 22 and discharged from the second turbine 22. Thus, the temperature of the working fluid taken into the first compressor 11 is low. Thus, power necessary for operating the first compressor 11 is reduced. As a result, the micro gas turbine system 10b is advantageous in enhancing the thermal efficiency.

Figure 5:
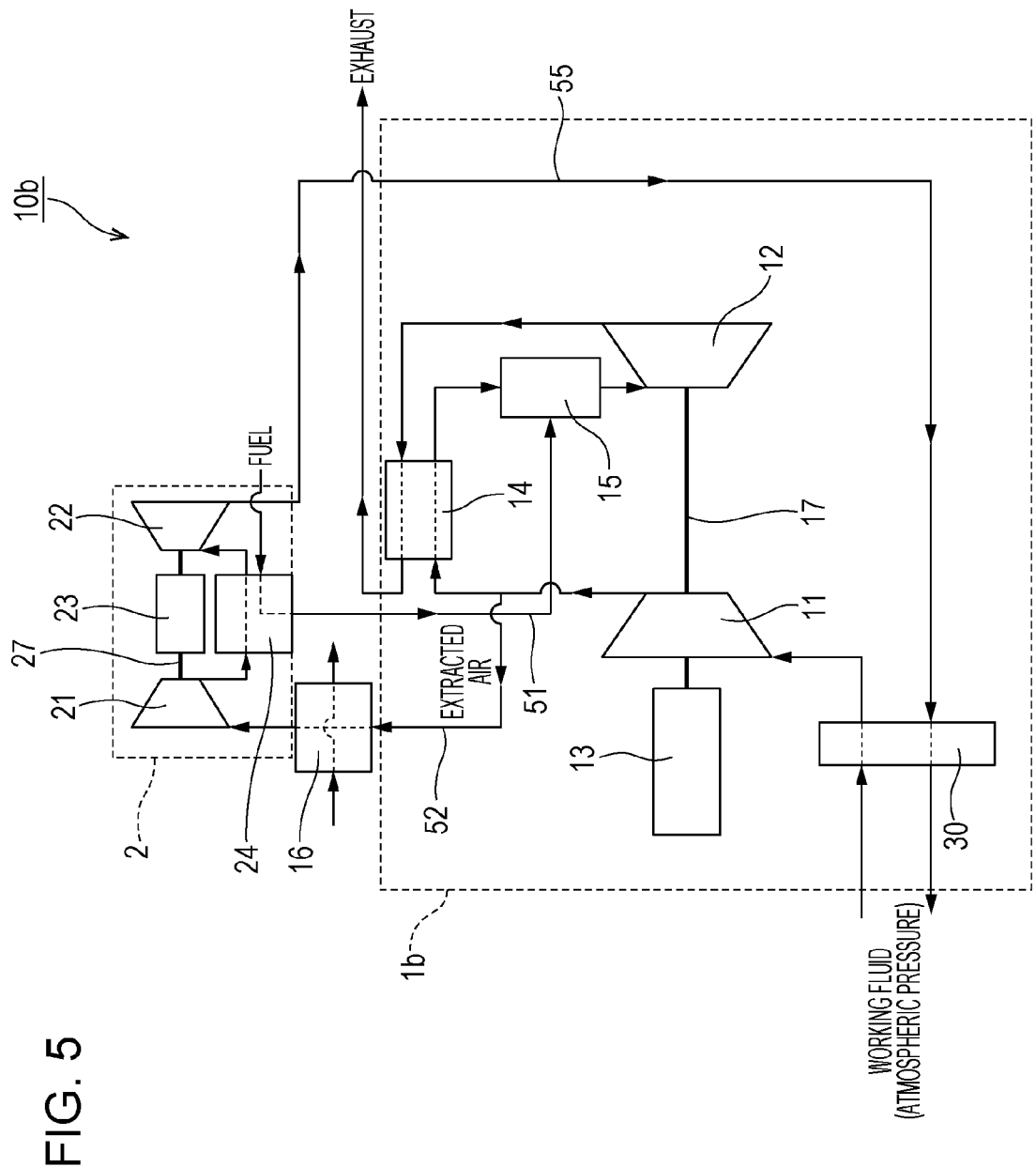
FIG. 5 is a configuration diagram of a micro gas turbine system according to a second embodiment.
Figure 6:
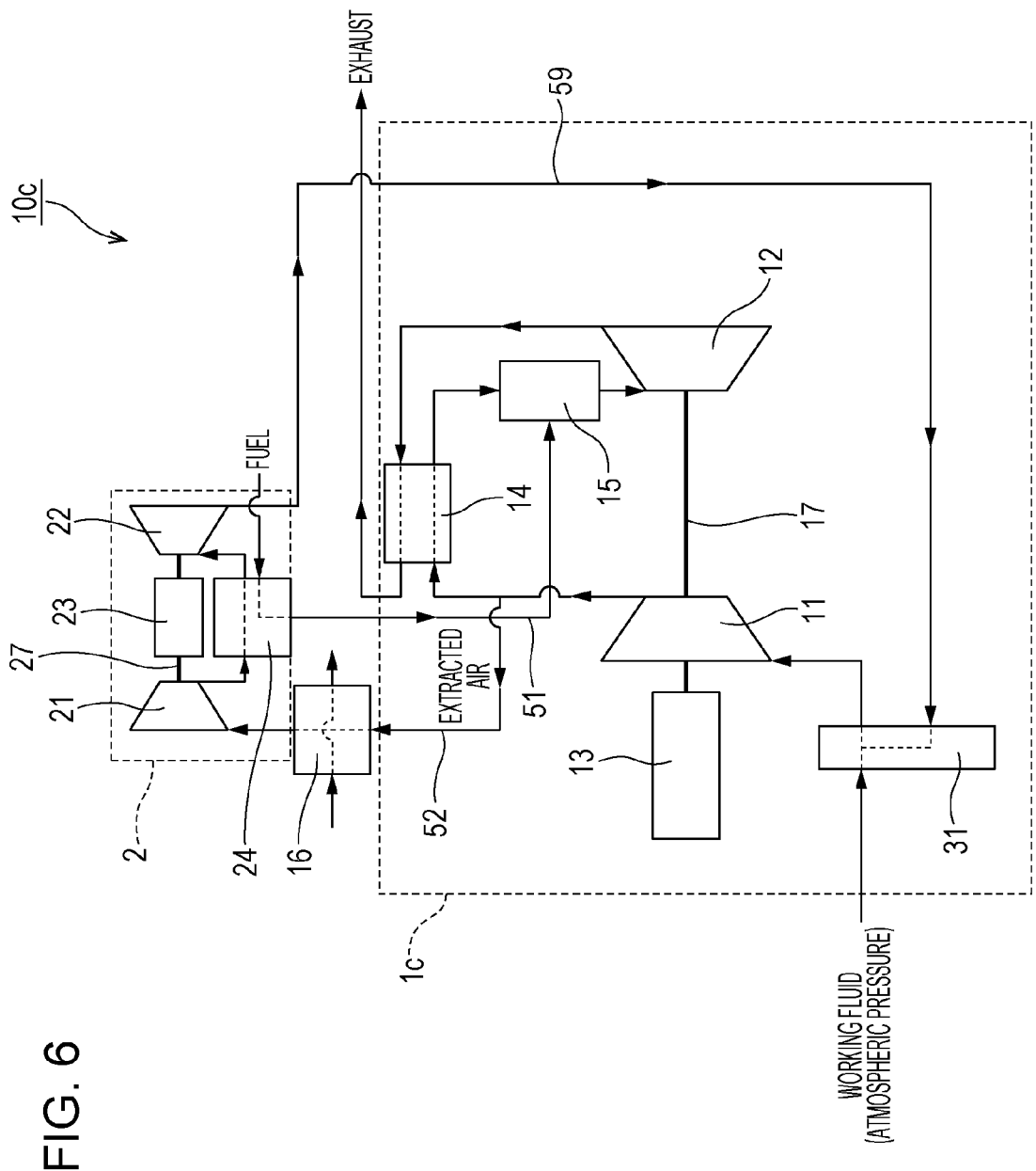
FIG. 6 is a configuration diagram of a micro gas turbine system according to a third embodiment.
Figure 7:
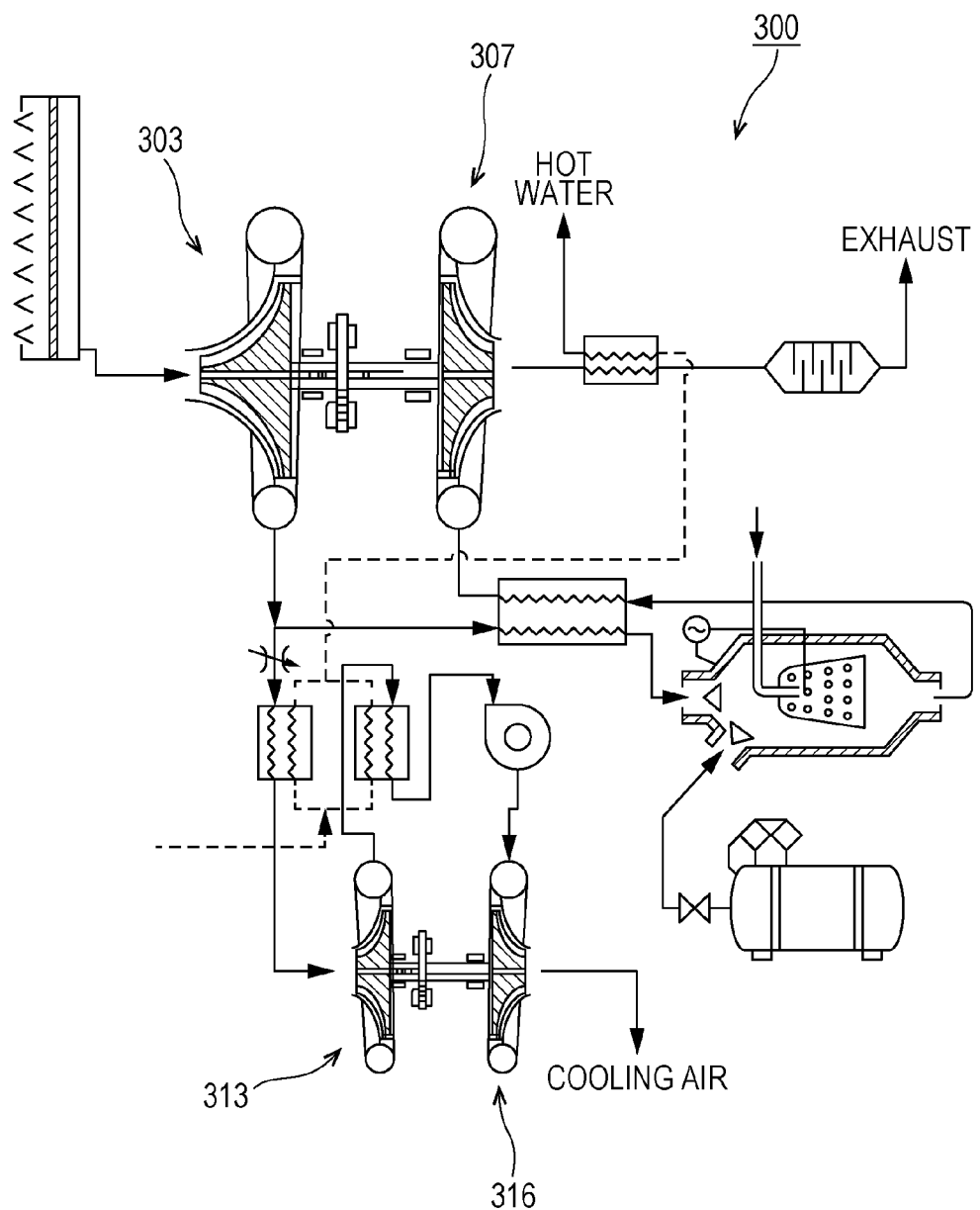
FIG. 7 is a configuration diagram of a conventional small gas turbine apparatus.
Figure 8:
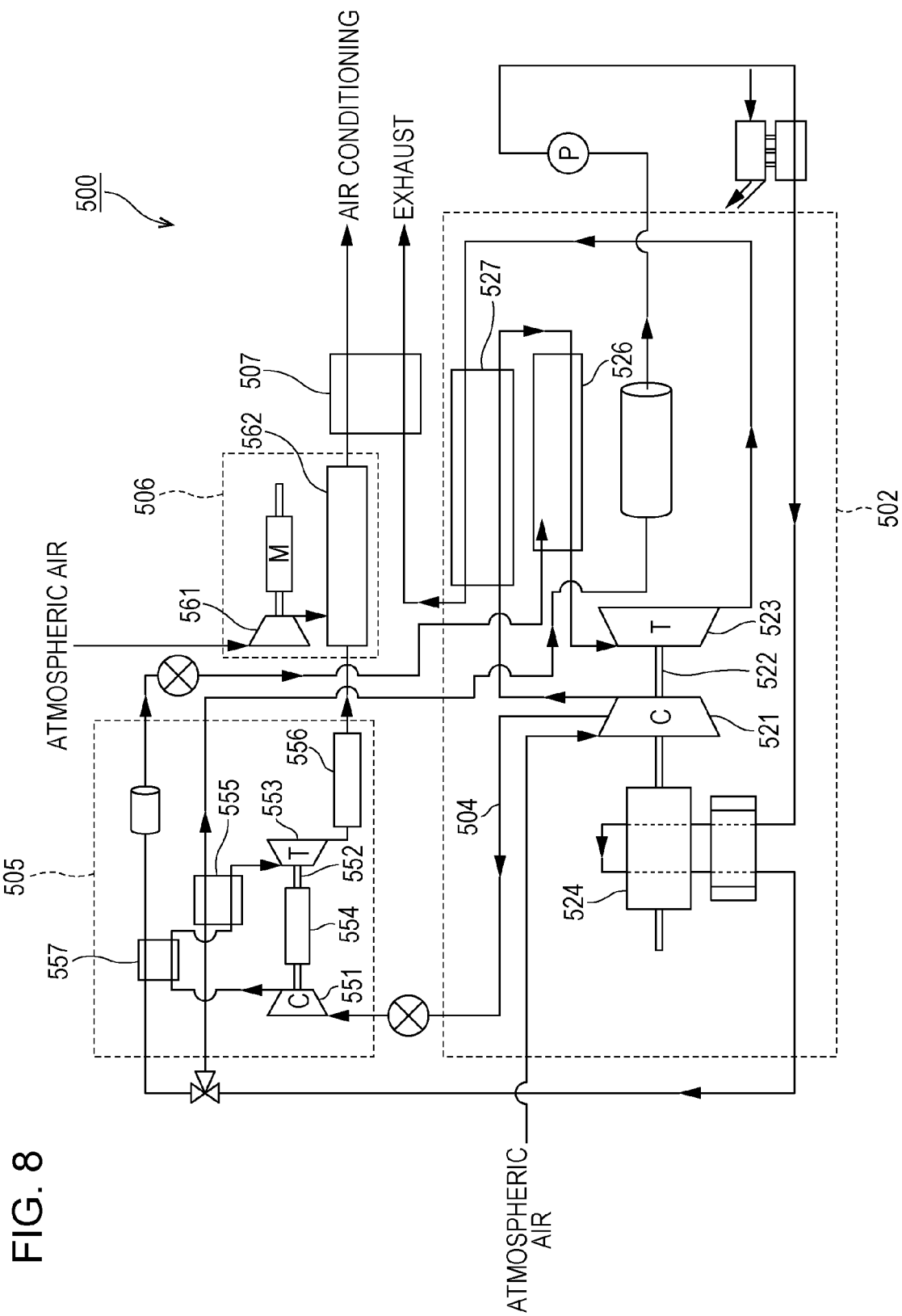
FIG. 8 is a configuration diagram of a conventional gas turbine system.

As illustrated in FIG. 5, the micro gas turbine system 10b includes a micro gas turbine apparatus 1b in place of the micro gas turbine apparatus 1a. The micro gas turbine apparatus 1b further includes a heat exchanger 30 and has the same configuration as the micro gas turbine apparatus 1a except that the micro gas turbine apparatus 1b has a passage 55 in place of the passage 53. The heat exchanger 30 is disposed upstream of the inlet of the first compressor 11 in a flow direction of the working fluid in the micro gas turbine apparatus 1b, and causes heat exchange between a working fluid to be fed to the first compressor 11 and a working fluid discharged from the second turbine 22. The second turbine 22 has a temperature lower than a temperature of the working fluid to be fed to the first compressor 11 and discharges a working fluid having a pressure higher than a pressure of the working fluid to be fed to the first compressor 11. Thus, the working fluid to be fed to the first compressor 11 is cooled down by the working fluid discharged from the second turbine 22.

The passage 55 connects an outlet of the second turbine 22 and the heat exchanger 30 with each other and serves as a passage for supplying the working fluid discharged from the second turbine 22 to the heat exchanger 30. Although not limited particularly, the heat exchanger 30 is, for example, a plate type heat exchanger.

The working fluid supplied to the heat exchanger 30 through the passage 55 is discharged to the outside of the micro gas turbine apparatus 1b. The pressure of the working fluid to be taken into the first compressor 11 is, for example, equal to the pressure of the environment where the micro gas turbine apparatus 1b is placed. For example, the micro gas turbine apparatus 1b is placed under the atmospheric pressure, which is the pressure of the working fluid to be taken into the first compressor 11. In such case, the second turbine 22 discharges a working fluid with a pressure higher than the pressure of the working fluid to be taken into the first compressor 11. For example, the electric motor 23 of the extracting cycle apparatus 2 adjusts the rotation speed of the second turbine 22 by load adjustment. Thus, the pressure of the working fluid discharged from the second turbine 22 is adjusted so as to become higher than the pressure loss in the passage 55 and the heat exchanger 30 plus the atmospheric pressure. Thus, the working fluid discharged from the second turbine 22 is continuously supplied to the heat exchanger 30.

Third Embodiment

A micro gas turbine system 10c according to a third embodiment is described. The micro gas turbine system 10c has the same configuration as the micro gas turbine system 10a except for components otherwise described. Components of the micro gas turbine system 10c identical or corresponding to components of the micro gas turbine system 10a are assigned with same reference numerals, and description thereof is omitted. Description regarding the first embodiment also applies to the third embodiment unless otherwise inconsistent technically.

The micro gas turbine system 10c cools down a working fluid to be fed to the first compressor 11, by using a working fluid expanded by the second turbine 22 and discharged from the second turbine 22. Thus, the temperature of the working fluid taken into the first compressor 11 is low. As a result, power necessary for operating the first compressor 11 is reduced. Thus, the micro gas turbine system 10c is advantageous in enhancing the thermal efficiency.

The micro gas turbine system 10c includes a micro gas turbine apparatus 1c in place of the micro gas turbine apparatus 1a. The micro gas turbine apparatus 1c further includes a mixer 31 and has the same configuration as the micro gas turbine apparatus 1a except that the micro gas turbine apparatus 1c has a passage 59 in place of the passage 53. The mixer 31 is disposed upstream of the inlet of the first compressor 11 in the flow direction of the working fluid in the micro gas turbine apparatus 1c. The mixer 31 passes the working fluid supplied from the outside of the micro gas turbine system 10c after mixing with a working fluid discharged from the second turbine 22. The second turbine 22 discharges a working fluid having a temperature lower than a temperature of the working fluid supplied from the outside of the micro gas turbine system 10c to the mixer 31. The second turbine 22 discharges a working fluid having a pressure higher than a pressure of the working fluid supplied from the outside of the micro gas turbine system 10c to the mixer 31. Thus, the temperature of the working fluid to be fed to the first compressor 11 becomes low. As a result, power necessary for operating the first compressor 11 is reduced, and thereby thermal efficiency of the micro gas turbine system 10c is enhanced.

For example, the electric motor 23 of the extracting cycle apparatus 2 adjusts the rotation speed of the second turbine 22 by load adjustment. With this adjustment, the pressure of the working fluid discharged from the second turbine 22 becomes higher than a pressure of the working fluid supplied from the outside of the micro gas turbine system 10c to the mixer 31. Thus, the working fluid discharged from the second turbine 22 is continuously supplied to the mixer 31. The pressure of the working fluid discharged from the second turbine 22 is, for example, 120% to 150% of the pressure of the working fluid supplied from the outside of the micro gas turbine system 10c to the mixer 31.

Micro gas turbine systems of the present disclosure may be applied to a stationary emergency generation systems and mobile main and auxiliary generation systems of the small entity.

What is claimed is:

1. A micro gas turbine system comprising:
   a micro gas turbine apparatus including:
   a first compressor that receives and compresses a working fluid;
   a burner that generates a combustion gas by injecting a fuel into the working fluid discharged from the first compressor; and
   a first turbine that is connected to the first compressor via a first shaft, and that expands the combustion gas generated by the burner, and
   an extracting cycle apparatus including:
   a second compressor that receives extracted air being a part of the working fluid discharged from the first compressor and that compresses the received extracted air as a working fluid; and
   a second turbine that is connected to the second compressor via a second shaft, and that expands the working fluid discharged from the second compressor, wherein
   the micro gas turbine apparatus uses the working fluid expanded by the second turbine and discharged from the second turbine to cool down at least a portion of the first turbine or to cool down the working fluid to be fed to the first compressor,
   the second turbine discharges the working fluid with a higher pressure than a pressure of at least a part of the combustion gas flowing in the first turbine,
   the micro gas turbine apparatus cools down at least the portion of the first turbine by using the working fluid with the higher pressure discharged from the second turbine,
   the first turbine is a radial turbine including:
   a turbine wheel that is fixed to the first shaft; and
   a turbine nozzle that includes nozzle blades disposed around the turbine wheel outside the turbine wheel in a radial direction,
   the micro gas turbine apparatus cools down the nozzle blades by using the working fluid with the higher pressure discharged from the second turbine,
   each of the nozzle blades includes:
   a passage which is formed inside the nozzle blade, and through which the working fluid with the higher pressure discharged from the second turbine flows; and
   a film cooling passage that extends from an inner peripheral surface of the nozzle blade only to an outer peripheral surface of the nozzle blade facing the turbine wheel, and that communicates with the passage and outside of the nozzle blade, and
   the first turbine further includes a back-side passage that communicates with the passage formed inside the nozzle blade and that extends to a portion of a rear face of the turbine wheel radially inside an end of the rear face of the turbine wheel in a radial direction,
   wherein an outlet of the second turbine is fluidly coupled to the passage which is formed inside the nozzle blade, and
   wherein the passage which is formed inside the nozzle blade, the film cooling passage, and the back-side passage are arranged so that a part of the working fluid from the second turbine flows through the passage which is formed inside the nozzle blade and the film cooling passage in this order, and at least a remaining part of the working fluid from the second turbine flows through the passage which is formed inside the nozzle blade and the back-side passage in this order, thereby the micro gas turbine apparatus cools down the nozzle blades and the turbine wheel by using the working fluid from the second turbine.

2. The micro gas turbine system according to claim 1, wherein
   the extracting cycle apparatus includes an electric motor that is connected to the second turbine via the second shaft, and
   the electric motor adjusts a pressure of the working fluid to be discharged from the second turbine by adjusting a rotation speed of the second turbine through load adjustment.

3. The micro gas turbine system according to claim 1, wherein
   the first compressor receives a flow of air with an atmospheric pressure as the working fluid.

4. The micro gas turbine system according to claim 1, wherein
   the first compressor is a centrifugal compressor.

5. The micro gas turbine system according to claim 1, further comprising:
   an inner tube disposed inside the nozzle blade, wherein
   the inner tube includes a through hole, the through hole being formed at a portion of an outer peripheral surface of the inner tube facing an inner peripheral surface of the nozzle blade where the film cooling passage is not formed.

6. The micro gas turbine system according to claim 1, wherein
   the micro gas turbine apparatus further includes a heat exchanger that is disposed upstream of an inlet of the first compressor in a flow of the working fluid in the micro gas turbine apparatus, and that causes heat exchange between the working fluid to be fed to the first compressor and the working fluid discharged from the second turbine, and
   the second turbine discharges the working fluid that has a temperature lower than a temperature of the working fluid to be fed to the first compressor and that has a pressure higher than a pressure of the working fluid to be fed to the first compressor.

7. The micro gas turbine system according to claim 1, wherein
   the micro gas turbine apparatus further includes a mixer that is disposed upstream of an inlet of the first compressor in a flow of the working fluid in the micro gas turbine apparatus, and that mixes the working fluid discharged from the second turbine with a working fluid supplied from outside of the micro gas turbine system, and discharges the mixed fluid, and
   the second turbine discharges the working fluid that has a temperature lower than a temperature of the working fluid supplied from the outside of the micro gas turbine system to the mixer, and that has a pressure higher than a pressure of the working fluid supplied from the outside of the micro gas turbine system to the mixer.

\* \* \* \* \*